P. A. MEEHAN.
WARE SUPPORT FOR KILNS.
APPLICATION FILED MAY 20, 1919.
1,386,012.
Patented Aug. 2, 1921.
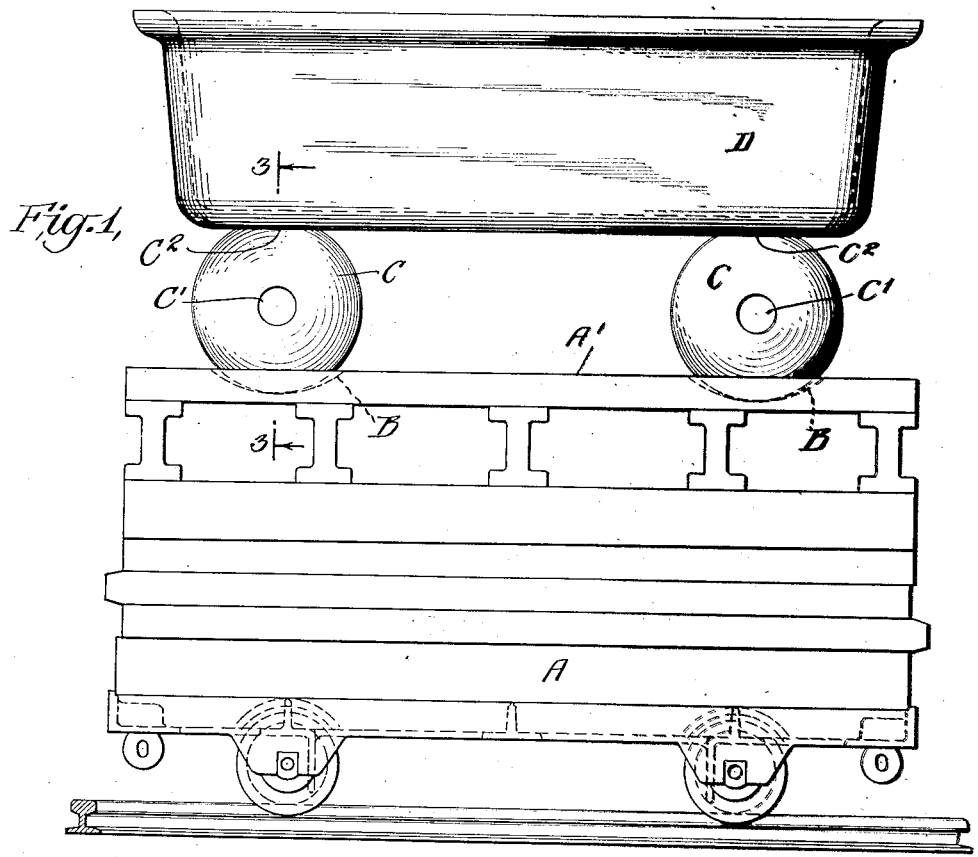
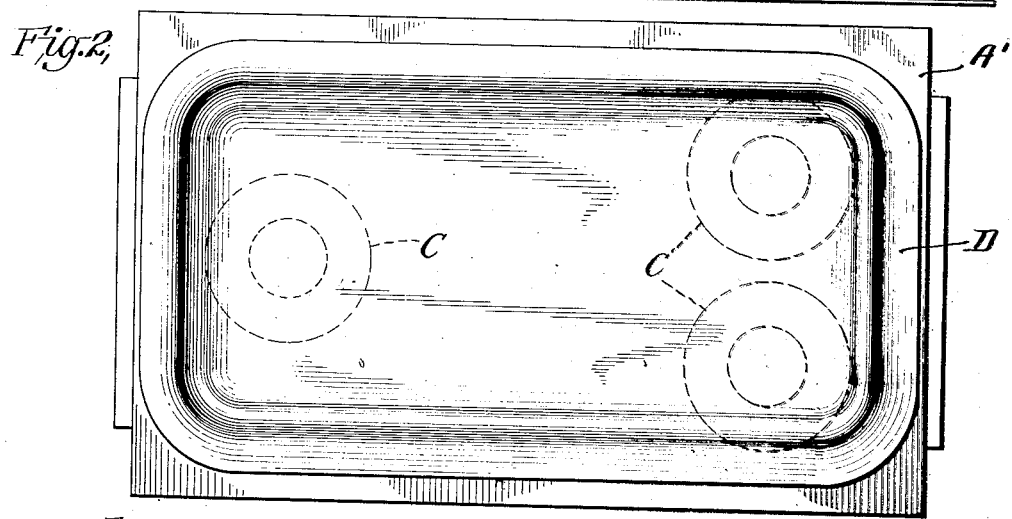
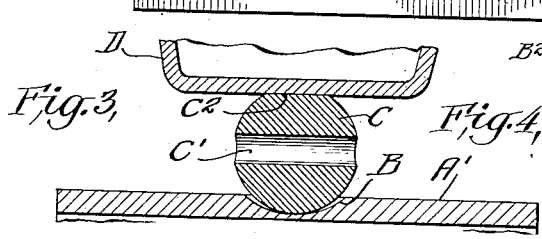
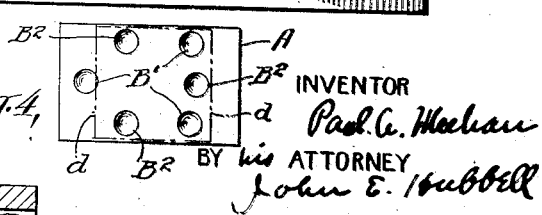
INVENTOR
Paul A. Meehan
BY his ATTORNEY
John E. Hubbell

UNITED STATES PATENT OFFICE.

PAUL A. MEEHAN, OF NEW CASTLE, PENNSYLVANIA, ASSIGNOR TO AMERICAN DRESSLER TUNNEL KILNS, INC., OF NEW YORK, N. Y., A CORPORATION OF NEW YORK.

WARE-SUPPORT FOR KILNS.

1,386,012.　　　　　Specification of Letters Patent.　　Patented Aug. 2, 1921.

Application filed May 20, 1919. Serial No. 298,374.

*To all whom it may concern:*

Be it known that I, PAUL A. MEEHAN, citizen of the United States, and resident of New Castle, in the county of Lawrence and State of Pennsylvania, have invented certain new and useful Improvements in Ware-Supports for Kilns, of which the following is a specification.

The general object of my present invention is to provide improved means for supporting wares in kilns and my invention was primarily devised to provide improved supports for wares such as glass pots moved into and out of annealing kilns or furnaces on cars.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of my invention.

On the drawings Figure 1 is a side elevation of an annealing kiln car having a glass pot supported thereon by my improved supporting means.

Fig. 2 is a plan view of the apparatus shown in Fig. 1.

Fig. 3 is a partial section on the line 3—3 of Fig. 1, and

Fig. 4 is a diagrammatic plan illustrating a modification of the apparatus shown in Figs. 1 and 2.

In the drawings A represents a car of the type used for transporting goods through the so-called continuous tunnel kilns. This car as is usual is formed with a top portion of refractory material. In the car top $A^1$ proper are formed a plurality of recessed seats B, and in each seat B rests a supporting body having a spherical seat engaging portion and a flattened seat $C^2$ on which the goods rest. As shown in Figs. 1 and 2 there are three of the goods supports C, each resting in a corresponding recess B. Resting on the flat sides $C^2$ of the supports C is the object D to be treated in the furnace. As shown the object D is a pot for holding molten glass after the pot is gradually brought up to a sufficiently high temperature. For this use the supporting bodies C may well be formed of fire clay and may be in the neighborhood of fifteen inches in diameter. As shown the bodies C are each formed with a diametral hole $C^1$ through which a bar may be passed by means of which the body may be lifted. Preferably, as shown, the seats B are spherical but have a radius of curvature slightly greater than that of the seat engaging portions of the supports C.

In handling ware like a pot D it is desirable to employ pier-like supports holding the pot above the top of the car body proper. This protects the pot from too rapid heating at its bottom when, as will usually be the case in the particular use specified, the pot is placed cold upon a car still quite hot from a previous passage through the kiln. The spherical supports C shown form desirable means for thus protecting a cold pot from the heat of the car body, and it is obviously a simple and easy matter to replace the supports C on a car which has just passed through the kiln by other supports C which are cool. When, as will ordinarily be the case, the pot which may weigh several hundred pounds is lowered into place on the car by an overhead crane or the like, it is of course difficult to avoid some shock tending to displace the pier-like supports when the weight of the pot is transferred from the overhead supporting mechanism to the supports. With the construction described, however, this does no harm since the supports C may roll or slide in their seats B sufficiently to enable them to take the load of the pot properly. The use of these supports as shown gives a "three point" bearing for the pot which insures the proper distribution of load on the different supports C. The flattened seats $C^2$ may well be made of ample area to avoid crushing strains on the supports or pot.

Where different sized pots are to be handled at different times on the same car, the latter may be formed with a plurality of sets of seats for supports C. Thus, as indicated in Fig. 4, there may be three seats $B^1$ provided on the car $A^{10}$ for the supports to take a relatively large pot say of the same general horizontal outline as the car and another set of three seats $B^2$ may be provided in which the supports are placed when a smaller sized pot, as for instance one having the outline indicated by the dotted line $d$, is to be mounted on the car.

While in accordance with the provisions of the statutes I have illustrated and described the best form of my invention now known to me, it will be apparent to those skilled in the art that changes may be made in the form of the apparatus disclosed without departing from the spirit of my invention as set forth in the appended claims.

Having now described my invention, what I claim as new and desire to secure by Letters Patent, is:

1. As a new article of manufacture, a member for supporting ware, subjected to heat, said member having one side flattened and its opposite side spherical.

2. As a new article of manufacture a ware supporting member having one side flattened and its opposite side spherical, and provided with a passage to receive a bar by which said member may be lifted.

3. The combination with a carrier for ware to be subjected to heat treatment in a furnace formed with recessed seats in its upper side, of goods supporting bodies of refractory material resting in said seats and formed with spherical surfaces engaging said seats and flattened at their upper sides to provide seats for the ware to be supported.

4. The combination with a carrier for ware to be subjected to heat treatment in a furnace formed with recessed spherical seats in its upper side, of goods supporting pots of refractory material resting in said seats and formed with spherical seat engaging surfaces of a shorter radius of curvature than said seats, and flattened at their upper sides to provide seats for the goods to be supported.

5. The combination with a carrier for ware to be subjected to heat treatment in a furnace, of bodies of refractory material, loosely seated on, and readily removable from said carrier and forming supports for the ware.

6. A carrier for ware to be subjected to heat treatment in a furnace comprising a body portion formed with recessed seats in its upper surface and bodies of refractory material loosely seated in said seats and readily removable from said carrier and forming supports for the ware.

Signed at New Castle, in the county of Lawrence and State of Pennsylvania, this 17th day of May, A. D. 1919.

PAUL A. MEEHAN.